INVENTOR.
ERNEST F. KUBLER
BY Stanley C. Corwin
HIS ATTORNEY

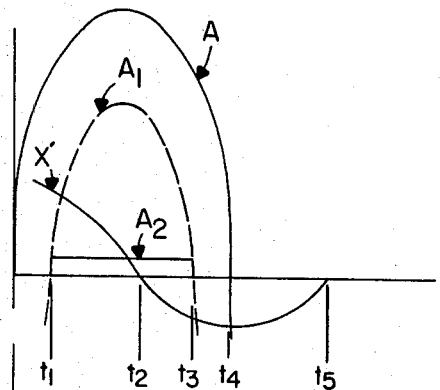
FIG. 2(a)
FIG. 2(b)
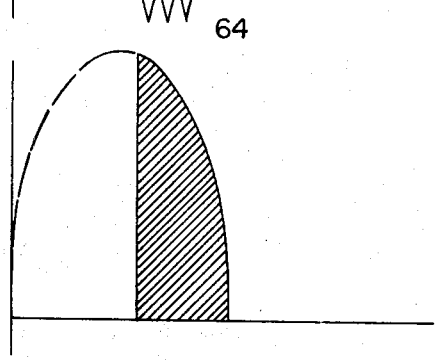
FIG. 2(c)
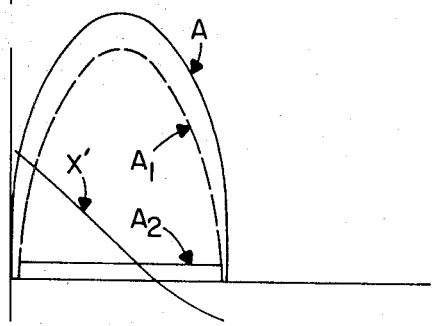
FIG. 2(d)
FIG. 2(e)
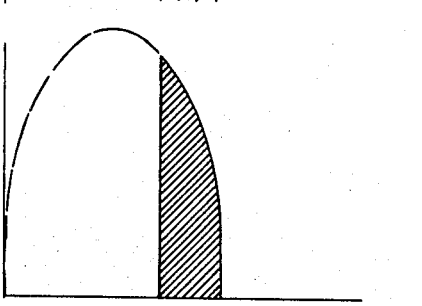
FIG. 2(f)
*INVENTOR.*
ERNEST F. KUBLER
BY
HIS ATTORNEY

*INVENTOR.*
ERNEST F. KUBLER
BY
HIS ATTORNEY

United States Patent Office 3,543,137
Patented Nov. 24, 1970

3,543,137
LOAD CONTROL CIRCUIT UTILIZING A TRIAC
Ernest F. Kubler, Waynesboro, Va., assignor to General Electric Company, a corporation of New York
Filed May 10, 1968, Ser. No. 728,291
Int. Cl. H02m 7/44
U.S. Cl. 321—43
11 Claims

ABSTRACT OF THE DISCLOSURE

A firing and control circuit for a bilateral thyristor driving a D.C. load from an A.C. source allows conduction of the thyristor to be initiated during one half cycle of the supply voltage without allowing conduction during the succeeding half cycle. A clipped alternating voltage is utilized to energize the two pulse-forming circuits which trigger the thyristor. Included in each pulse forming circuit is a relaxation oscillator using a breakover semiconductor switch whose initiation and termination of oscillation is controlled by application of the corresponding clipped voltage.

BACKGROUND OF THE INVENTION

This invention relates to reversing half cycle load control circuits of the type utilizing a bilateral thyristor.

Direct current loads such as motors may be supplied from an A.C. source by the use of silicon controlled rectifiers (SCR's). With one SCR a half wave unidirectional motor drive is obtained. By adding a second SCR in back to back parallel configuration it is possible to drive the motor in either direction. Reversible motor drives using SCR's have proved satisfactory. However, with the discovery of the TRIAC, a bilateral thyristor having operating characteristics similar to back to back SCR's, a simpler single device motor control has been made possible.

The TRIAC, its characteristics described in the General Electric SCR Manual, fourth edition, pages 133–141, has several advantages over two silicon controlled rectifiers utilized in back to back parallel configuration to drive a D.C. load from an A.C. source. First of all, because the TRIAC is a single device it offers economy of size, space, connection and mounting. Secondly, selection of two matched devices is unnecessary to obtain similar operating characteristics for conduction in either direction. On the other hand, the TRIAC produces some peculiar problems of its own. The TRIAC can be turned on by either negative or positive pulses irrespective of the polarity of the voltage across the device. This feature eliminates the automatic autocommutation feature of the SCR, i.e., when the polarity of the supply voltage changes so that the SCR is reverse biased it will be turned off in spite of the presence of trigger pulses on the gate electrode.

Both the advantages of the TRIAC and its unique operating characteristics are realized when controlling a servomotor in a positioning system where precise definition of starting characteristics is required for motion in either direction. Here the servomotor is often required to be precisely jogged in either direction to zero into the desired machine position. Thus, the TRIAC may be fired late in a half cycle of the supply voltage and proper control circuitry must enable this device to be free to conduct on the successive half cycle of supply voltage in the opposite direction.

SUMMARY OF THE INVENTION

It is accordingly an objection of the present invention to provide a control circuit for a TRIAC reversible D.C. drive.

Another object of the present invention is to provide a circuit for precisely controlling the turn-on and turn-off of a TRIAC.

In general these objects are achived in a control circuit which adds the individual cycle commutation capability of an SCR to the TRIAC. The control circuit includes an AC+DC phase controlled switch which adjusts the firing of the triggering oscillator for the TRIAC for each half cycle of operation. The supply for the switch is a time controlled pulse train derived from the A.C. voltage source thus providing the switch with the desired second control for the turn-off of the TRIAC by controlled removal of the TRIAC triggering pulses supplied by the oscillator.

BRIEF DESCRIPTION OF THE DRAWINGS

The objects of the invention may be better understood by reference to the following detailed description of one embodiment of the TRIAC control circuit taken in conjunction with the attached drawings wherein:

FIG. 2(a)–2(f) and 3(a) and 3(b) are timing diagrams illustrating the operation of the control circuit shown in FIG. 1.

DESCRIPTION OF THE PREFERRED EMBODIMENT

Figure 1:
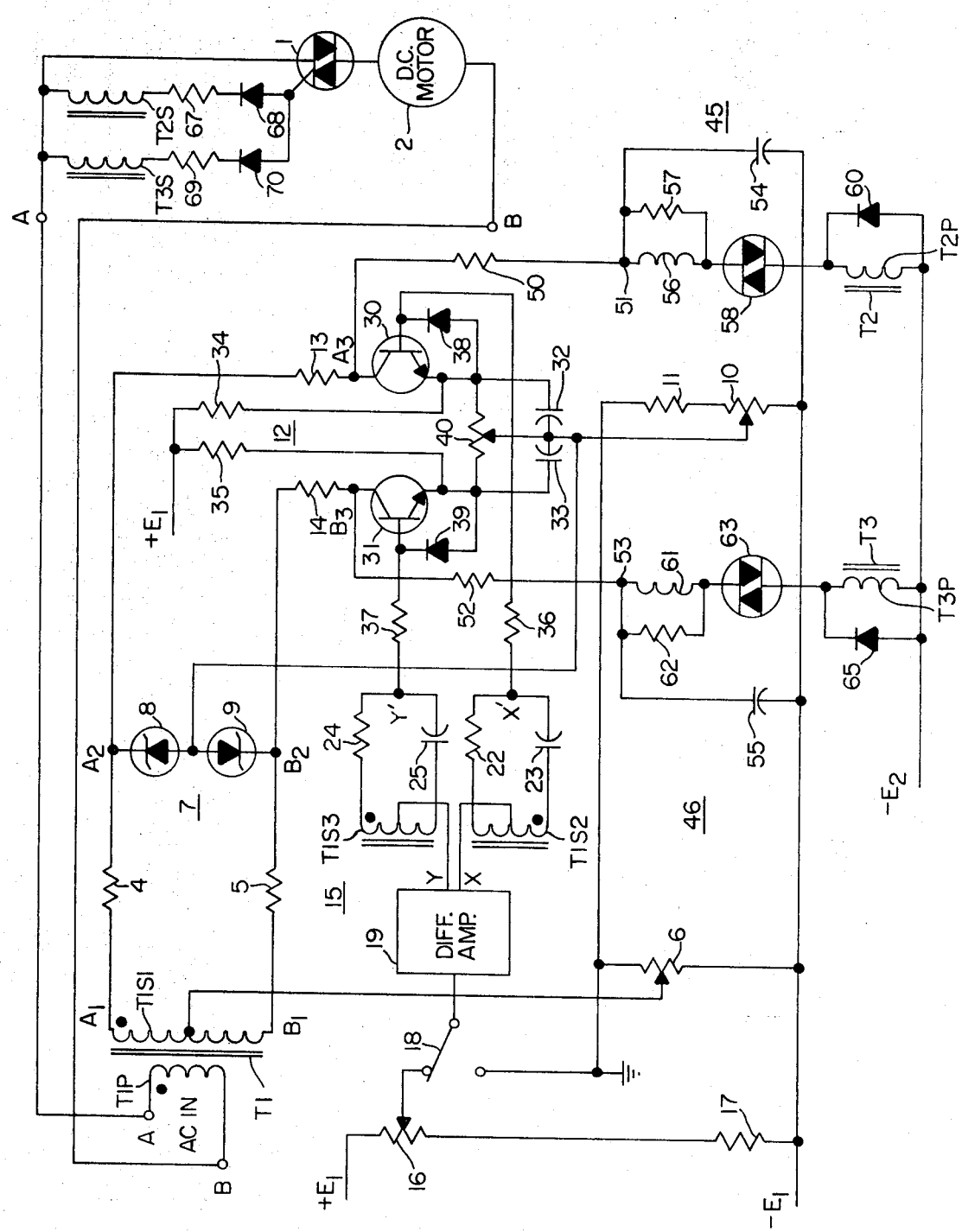
FIG. 1 is a schematic diagram of a control circuit constructed according to the teachings of this invention.

Referring now to FIG. 1 there is shown an alternating voltage source applied across both the firing and control circuit and the TRIAC 1 at the circuit input points A, B. The alternating voltage is applied across the primary winding T1P of a transformer T1 at the points A and B. The input points A, B are common with the extremities of the primary winding T1P of transformer T1. Transformer T1 has a center-tapped secondary winding T1S1, the ends of which are designated $A_1$ and $B_1$. The turns ratio of transformer T1 is chosen in accordance with the magnitude of the supply voltage and the magnitudes of the voltages which are desirable for the ensuing firing and control circuitry. Transformer T1 also has two auxiliary secondary windings which will be described hereinafter. Point $A_1$ is connected to a common point $A_2$ through a resistor 4 and point $B_1$ is similarly connected to a point $B_2$ through a resistor 5. The center tap of the secondary winding T1S1 is connected to a tap of a potentiometer 6 which is disposed between a reference level, such as ground and a negative voltage supply $-E_1$.

The voltage appearing between the center tap and either point $A_1$ or point $B_1$ will be approximately one half the voltage across the entire secondary. The unidirectional voltage at the center tap is determined by the setting of potentiometer 6 and may vary from the reference level or ground potential to the negative potential $-E_1$. These considerations reveal that the voltage appearing at point $A_1$ is in phase with the supply voltage appearing at point A, has approximately half its peak magnitude, and is shifted in level with respect to the reference level or ground by an amount determined by the setting of potentiometer 6. The voltage appearing at point $B_1$ is similar, except that it is phase shifted 180°.

Plots of these voltages with respect to the reference level are shown in FIG. 2. In FIG. 2(a), one half cycle of both the supply voltage appearing at point A and the voltage appearing at point $A_1$ are illustrated. By level shifting the voltage at $A_1$ such as by adding a negative direct voltage at the center tap of T1S1 the waveform thereof becomes positive at a later times than does the supply voltage at A. The voltage relationships at points B and $B_1$ are similar. The necessity for level shifting the voltage at $A_1$ and $B_1$ will be seen later; at this point, it is sufficient to note that the voltages at $A_1$ and $B_1$ must be positive for a shorter time period with respect to the reference level than those at A and B.

Disposed between point $A_2$ and $B_2$ is a means 7 for clipping the voltages appearing at points $A_1$ and $B_1$. Clipping means 7 may comprise two breakdown diodes 8 and 9. As shown, diode 8 has its cathode connected to point $A_2$ and its anode to the anode of diode 9. Diode 9 has its cathode connected to point $B_2$. Diodes 8 and 9 are biased at their interconnected anodes by a source of unidirectional voltage obtained from the tap of a potentiometer 10 which has one terminal connected to ground potential through a resistor 11 and another terminal connected to the negative voltage $-E_1$. The setting of potentiometer 10 determines the clip level or point at which either diode 8 or 9 will break down. When breakdown occurs, the voltage at either $A_2$ or $B_2$ is limited to the value present at breakdown.

Points $A_2$ and $B_2$ are connected to two inputs $A_3$, $B_3$ of FIG. 1 of a switching means 12 by resistors 13 and 14. The voltages appearing at points $A_2$ and $B_2$ are used to energize succeeding pulse forming circuitry controlled by switching means 12. Essentially the voltage $A_3$ is in phase with the voltage at A but is clipped by diode 8 when transistor 30 is not conducting and is the same as $A_2$ (FIG. 2(a)) when 30 is not conducting. The switching of transistor 30 will be described shortly. Similarly, there exists a relationship between $B_3$, B and $B_2$. The voltage $A_3$ is shown in FIG. 2(a). The relationship of voltages $A_3$, $B_3$ to the source voltage at A and B is noted and will be described below.

A control circuit 15 produces control voltages for the switching means 12. Control circuit 15 includes a potentiometer 16 having one terminal connected to a positive voltage supply $+E_1$ and the other terminal connected to the negative supply $-E_1$ through a resistor 17. The tap of potentiometer 16 is connected to one terminal of a switch 18, the other terminal of switch 18 being connected to ground. The arm of switch 18 is connected to an input of an amplifier and control circuit 19. When switch 18 is connected to potentiometer 16, amplifier 10 will simultaneously provide distinct output signals at separate output terminals. One of the outputs of amplifier 19 is designated X. This signal serves to control the portion of switching means 12 associated with the voltages appearing at point $A_3$. Thus the signal appearing at point X may be used to control the bilateral gated semiconductor switch 1 during the positive portions of the voltage waveform impressed thereacross. Similarly, the second output of amplifier 19 is designated Y and this signal controls the bilateral gated semiconductor switch 1 during the negative portions of the voltage waveform impressed thereacross.

Amplifier and control circuit 19 preferably comprises a long-tailed pair or emitter-coupled differential amplifier such as is well known in the art. This amplifier, for example, could be of the type shown in the General Electric Transistor Manual, 7th edition, page 111. For the application at hand, the base lead of one transistor of this two transistor amplifier is connected to ground, the base lead of the other transistor being connected to switch 18. When switch 18 is connected to ground the amplifier is in a balanced condition and the X and Y outputs from the collectors of the two transistors are substantially at the same at rest potential, the value of which is determined by the common emitter resistor and the source of voltage to which it is connected. When switch 18 is connected to potentiometer 16, the difference between the voltages appearing at the base electrodes of the amplifier's transistors is amplified so that the X output (for example) is raised from the at rest potential and the Y output is lowered from the at rest potential. Since potentiometer 16 is connected between positive and negative voltage supplies, the X or Y output from amplifier 19 can either be raised or lowered in push-pull fashion from the at rest value.

The two auxiliary secondary windings of transformer T1 previously mentioned are designated in FIG. 1 as T1S2 and T1S3. Winding T1S2 is poled in the same direction with respect to the primary winding of transformer T1 so that the voltage on its upper lead is positive when the voltage on point A is positive as signified by the voltage polarity dots at the upper end of these windings. Winding T1S3 is poled in the opposite direction, so that when the voltage appearing on its upper lead is positive, the voltage appearing on point A is negative. Point X of amplifier 19 is connected to a center tap of winding T1S2 and point Y to a center tap of winding T1S3. Connected across winding T1S2 is a series circuit of a resistor 22 and a capacitor 23 and a similar circuit including resistor 24 and capacitor 25 is connected across winding T1S3. The midpoint of each series circuit is designated as X' and Y', respectively.

The resultant voltage waveform appearing at point X' is illustrated in FIGS. 2(a) and 2(d). The voltage at X1 leads the supply voltage appearing at point A by 90° in FIG. 2(a) and is level shifted by an amount equal to the voltage appearing at point X. FIG. 2(d) shows that the value of the voltage X has increased to cause the zero crossover of the X' firing wave to occur later in the half cycle of the supply voltage.

The voltages appearing at point X' and Y' directly serve as control voltages for the switching means 12, which comprises two semiconductor switching devices 30 and 31 depicted in FIG. 1 as two npn transistors. Transistor 30 has its collector connected to point $A_3$ and transistor 31 has its collector connected to point $B_3$. The emitter of transistor 30 is connected through a capacitor 32 to the tap of potentiometer 10 and the emitter of transistor 31 is likewise connected through a capacitor 33 to the tap of potentiometer 10. The emitter of transistor 30 is also connected through a resistor 34 to the positive voltage supply $+E_1$ and the emitter of transistor 31 is likewise connected to $+E_1$ through resistor 35. Point X' is connected to the control electrode of the semiconductor switching device 30 by means of a resistor 36 and point Y' is connected to the base of transistor 31 by means of a resistor 37. Two diodes 38 and 39 are respectively connected between the bases of transistors 30 and 31 and the emitters thereof. A potentiometer 40 is connected between the emitters of transistors 30 and 31 and has its tap connected to the tap of potentiometer 10. Finally, points $A_3$ and $B_3$ are coupled to the inputs of pulse-forming circuits 45, 46, respectively.

In operation, both transistors 30 and 31 have their emitters biased at about ground potential by proper choice of values of the resistors 34 and 35, the setting of potentiometer 40, and the setting of potentiometer 10. Potentiometer 40 in addition provides a means of adjustment to account for emitter to base voltage differences in transistors 30 and 31. Since transistors 30 and 31 are biased at about ground potential, each can be turned on by application of current from a positive voltage applied to its base electrode. Therefore, referring to FIG. 2(a), transistor 30 will be placed in and maintained in a conducting condition for positive portions of the waveform appearing at point X'. Similarly, transistor 31 will be turned on during positive portions of the waveform appearing at point Y'. If either transistor 30 or 31 is conducting, the collector electrode thereof and thus either point $A_3$ or $B_3$ will be at approximately ground potential. During conduction, then, the switching means 12 blocks the voltage at point $A_2$ or $B_2$ from circuit 45 or 46, the voltage being dissipated through resistors 13 or 14.

Figure 3A:
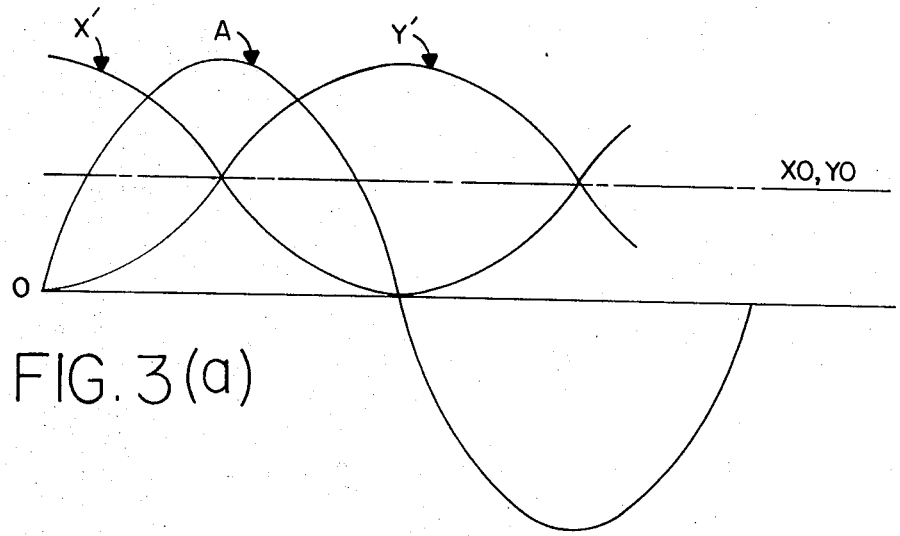

Referring now to FIG. 3, the AC+DC outputs X' and Y' from the transformer secondary circuits T1S2 and T1S3 are shown in relation to the source and voltage at A. In FIG. 3(a) the at-rest situation is shown. Here the amplifier 19 outputs X and Y are shown at the level $X_0$, $Y_0$, a positive value which prevents X' or Y' from crossing the zero axis. Thus a positive voltage is applied to the base electrodes of both transistors 30 and 31 at all times and the voltages $A_3$ and $B_3$ are held at ground potential so that both oscillators 45 and 46 are prevented from oscillating.

Figure 3B:
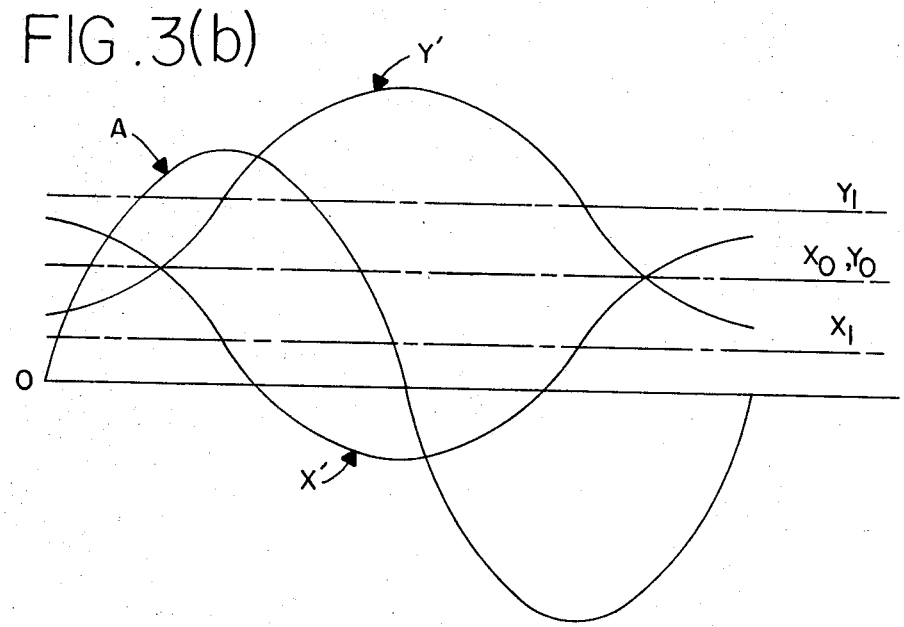

In FIG. 3(b), the DC voltage X is shown as $X_1$ negative with respect to the $X_0$, $Y_0$ at-rest potential, while the seesaw action of amplifier 19 results in Y being at $Y_1$ positive with regard to the at-rest potential by an equal amount. This result would be obtained by an adjustment of the speed control potentiometer 16.

From FIG. 3 it can be seen that except for the at-rest position either transistor 30 or transistor 31 is conducting. Whenever the DC voltage X is more positive than the at-rest level, the voltage Y is negative by an equal amount. Because of this, only the varying voltage X' or the varying voltage Y' will cross zero axis and thus only one transistor will be conducting at any one time so that only one oscillator will produce the trigger pulses for the TRIAC which drives the load.

Point $A_3$ is coupled by a resistor 50 to a common point 51 in pulse forming circuit 45. Point $B_3$ is coupled through a resistor 52 to a common point 53 in circuit 46. A capacitor 54 is connected from common point 51 to the negative voltage supply $-E_1$ and a capacitor 55 is likewise connected from the common point 53 to $-E_1$.

In circuit 45, a reactor 56 and a resistor 57 are connected in parallel from common point 51 to one terminal of a breakover semiconductor switch 58. The other terminal of breakover switch 58 is connected to a negative voltage supply $-E_2$ through a primary winding T2P of a pulse transformer T2. A diode 60 is connected across the primary winding T2P.

In like vein, a reactor 61 and a resistor 62 are connected in parallel from common point 53 at circuit 46 to one terminal of a breakover semiconductor switch 63 whose other terminal is connected through a primary winding T3P of a pulse transformer T3 to the negative voltage supply $-E_2$. A diode 65 is connected across the primary winding T3P.

Each of the two pulse forming circuits 45, 46 comprises a relaxation oscillator which is placed into oscillation by presence of a voltage at point $A_3$ or $B_3$. Preferably, each circuit uses the properties of a breakover semiconductor switch having a negative resistance region in its voltage current characteristic. For a geneal desciption of the breakover switches and their operation in a relaxation, oscillator configuration, reference should be made to the General Electric SCR Manual, 4th edition, section 4.14, pp. 73–82. In the configuration illustrated in FIG. 1, breakover switches 58 and 63 comprise that known as a DIAC.

To understand the operation of the oscillators, it should be noted that the voltage supply $-E_2$ is greater in magnitude than the voltage supply $-E_1$. It is assumed that capacitors 54 and 55 are initially discharged. Considering only the positive portion of the supply voltage waveform at point A, at the instant when transistor 30 is placed in a conducting condition and the voltage at point $A_3$ goes to approximately ground potential, the voltage impressed across switch 58 is equal to $-E_2$ minus $(-E_1)$. This voltage must be substantially less than the voltage needed to cause the switch 58 to break over into a conducting condition. Thereafter, capacitor 54 charges through resistor 50 until the voltage across it is approximately $-E_1$. At this point, current flow through resistor 50 ceases and the voltage impressed across the switch 58 is approximately $-E_2$. $-E_2$ must be chosen so that it is slightly less than the breakover voltage. In the case of the DIAC, breakover voltage is approximately 32 volts, and a suitable value for $-E_2$ would be $-30$ volts. The breakover voltage is adjusted by potentiometer 10.

Now referring to FIG. 2(a) and again considering only the positive half cycle firing circuit 45, when the voltage appearing at point X' goes to 0 at time $t_2$, transistor 30 is placed in a nonconducting condition. In fact, transistor 30 will be maintained in this nonconducting condition as long as the voltage appearing at X' is negative with the current therefrom flowing through diode 38 to maintain the base electrode at approximately ground potential. When transistor 30 is placed in a nonconducting condition, the clipped voltage appearing at $A_2$ is added to that maintained on the switch 58 by capacitor 54 to cause the switch 58 to break over. Upon breakover, switch 58 produces a voltage and current pulse through the primary winding T2P of pulse transformer T2. This and succeeding pulses are shown in FIG. 2(b).

It is noted in FIG. 2(a) that the firing voltage wave X' is negative from time $t_2$, when the supply voltage A is positive, until time $t_5$, when the supply voltage is negative. Were it not for the clipped voltage supply $A_2$ which is applied to switch 12 and oscillators 45 and 46, pulses would be generated throughout the period $T_3$–$T_7$. Due to the nature of the TRIAC, there is no commutation when the supply voltage changes polarity and the constrained trigger pulses into the negative half cycle of the supply voltage would permit and undesirable and harmful alternating voltage to be applied to the load. Thus, it can be seen that the clipping means 7 controls the duration of the supply voltage $A_2$ which is applied to the trigger circuit 45, 46 by switch 12 and thereby controls the point of cessation of the trigger pulses.

In producing the pulse, the breakover semiconductor switch 58 discharges capacitor 54. When the voltage across the switch 58 falls to a point where the switch ceases to conduct, the capacitor 54 again charges and switch 58 will again break over and another pulse will be produced. In this manner, a plurality of pulses can be produced in the primary of pulse transformer T2.

On the negative half cycle, breakover semiconductor switch 63 and capacitor 55 may coact in a similar manner to produce a plurality of pulses in the primary winding of pulse transformer T3.

FIG. 1 shows the secondaries T2S and T3S of pulse transformers T2 and T3 connected to the gate electrode of the bilateral thyristor through resistor 67 and diode 68, and resistor 69 and diode 70, respectively. Thus, the bilateral thyristor or TRIAC can be placed in a conducting condition on either half cycle of the supply voltage by pulses appearing at the secondaries of transformers T2 and T3. Reference should be made to FIGS. 2(c) and 2(f) in which the voltage appearing across load 3 is plotted for positive half cycle forward (for example) motor drive. It should be understood from FIG. 2 that when the direct voltage command X is negative, the Y command is positive and transistor switch 30 will be off for a portion of each positive half cycle of the supply voltage so that pulses from oscillator 45 will trigger the TRIAC as shown, while transistor switch 31 will conduct at all times so that no pulses will be applied to the TRIAC during negative half cycles.

Breakover switches 58 and 63 can continue to oscillate only if the voltage appearing at points $A_2$ and $B_2$ is enough, when added to the voltage stored across capacitors 54 and 55, to reach the breakover point of the particular device's characteristic curve. By clipping the waveform appearing at points $A_1$ and $B_1$, the termination of oscillation can be precisely controlled. The clipping point should be adjusted by means of potentiometer 10 so that when the voltage appearing at $A_1$ or $B_1$ drops below the clipping level, the DIAC cannot continue to break over. By limiting the voltage across the DIAC during its conduction period, termination of oscillation can be assured before the zero crossing point of the supply voltage waveform is reached. Further, as the clipping level is constant, this point of oscillation termination can be moved closer to the zero crossing point without exceeding the voltage across transistors 30 and 31. This can be better understood by comparing the square wave voltage $A_2$ which is utilized to the sinusoidal wave $A_1$. Since it is desirable to be able to trigger the TRIAC late in the half cycle, the supply voltage to the oscillators 45, 46 must be sufficient to cause the DIAC to break over. If a sinusoid such as $A_1$ is used as the supply for these oscillators it would have to have a significantly large amplitude at the 90° point in order to be sufficiently large to cause the DIAC to break over late in the half cycle. This could be deleterious to the transistors 30 and 31. Thus the constant amplitude wave voltage $A_2$ is employed because it offers both adequate voltage throughout the half cycle of the supply voltage A and also can be tolerated by the transistors 30 and 31. In sum, by adjustment of potentiometer 6, it can be assured that (a) firing pulses will not continue into the succeeding half cycle and (b) firing pulses will cease a sufficient time for recombination to occur in both the conducting breakover semiconductor switch 58 or 63 and in TRIAC 1 so that conduction will not continue into the succeeding half cycle.

This invention has been described with the aid of a preferred embodiment. This is for the purpose of illustrating the invention and should not be construed in a limiting sense since various changes from the preferred embodiment can be made without departing from the spirit or scope of the invention. For example, while two oscillators 45, 46 are shown, one oscillator controlled to provide pulses only in selected half cycles of the AC source would suffice. In addition, while a DIAC was selected as the active element of the oscillators to obtain relatively large volt second firing pulses, it could readily be replaced by a unijunction or other well known oscillator, compensation being made for the volt second requirements of the thyristor used. Also, while the drawings show that the AC+DC firing waves applied to switch 12 are both positive in the at-rest mode so that the motor load is at rest, by simple adjustment of amplifier 19 both the X' and Y' waveforms can be caused to cross the zero axis near the end of each half cycle causing the motor to vibrate. This small vibration of the motor in the at-rest mode permits ready movement of the motor in either commanded direction by avoiding at-rest stick friction.

It is also important to note that the clipped voltage $A_2$, $B_2$ supply for the oscillators 45, 46 acts as a second switch in addition to the oscillation initiating switch 12, to turn off the oscillators. It is apparent that this clipped voltage could be replaced by a second switch which controls the application of a variable width square pulse to the oscillators. This switch could be synchronized to the source voltage A. In addition, by connecting the wiper arm of potentiometer 6 through a capacitor network to points $A_2$, $B_2$ it is possible to obtain another degree of control by phase shifting waveforms $A_2$, $B_2$. This is especially desirable to obtain later in the cycle conduction.

What is claimed as new and desired to be secured by Letters Patent of the United States is:

1. A control circuit for a bilateral thyristor reversible AC to DC drive, comprising:
   trigger means coupled to said thyristor for controlling the conduction thereof,
   switch means coupled to said trigger means,
   first signal means coupled to said switch means for controlling the initiation of trigger pulses,
   second signal means coupled to said switch means for controlling the cessation of trigger pulses, and means for coupling said first signal means to an AC source, said first signal means responsive to the polarity of the half cycle of said source to insure generation of trigger pulses only during selected half cycles.

2. A control circuit as recited in claim 1 wherein said second switch means controls the supply voltage for said trigger means, said second switch means being synchronized with said AC source so that supply voltage is applied to said trigger means for controlled periods within each half cycle of said AC source.

3. A control circuit as recited in claim 2 wherein said second switch means includes control means for adjusting the duration of a supply voltage for the trigger means within each half cycle to permit turnoff of said thyristor with each half cycle zero crossover.

4. A control circuit as recited in claim 3 wherein said switch means comprises voltage clipping and rectifying means coupled to said source of AC to derive a supply voltage of synchronous direct voltage pulses, said control means comprising a source of adjustable direct voltage applied to said voltage clipping and rectifying means to adjust the clipping level thereby controlling the width of each direct voltage pulse.

5. A control circuit as recited in claim 4 wherein said first switch means couples said direct voltage pulses to said trigger means, said first switch means controlling the time in each half cycle at which a direct voltage pulse is applied to said trigger means.

6. A control circuit as recited in claim 5 wherein said first switch means comprises a pair of switch devices one responding to direct voltage pulses from said second switch means occurring during positive half cycles of said AC source and the other responding to direct voltage pulses occurring during negative half cycles of said AC source, said command means being coupled to said pair of switch devices to control the conduction thereof, said trigger means being responsive to said pair of switch devices to generate trigger pulses during positive half cycles of said AC source at the switching of said one switch device and generating trigger pulses during negative half cycles of said AC source at the switching of said other switch device.

7. A control circuit as recited in claim 6 wherein said command means is coupled to said source of AC and includes phase shift means, voltage adjusting means to derive an adjustable direct voltage command, a voltage reference, and an amplifier to differentiate the voltage command from said voltage reference and produce dual direct voltage outputs, and combining means to combine said direct voltage output with the phase shifted AC to form first and second DC plus AC firing waves for said pair of switch devices.

8. A control circuit as recited in claim 7 wherein said amplifier is a differential amplifier and said dual outputs seesaw above and below the at rest amplifier output level by an amount proportional to the differential between said direct voltage command and said voltage reference, said switch devices being biased to the threshold of switching for said at rest amplifier output level such that the seesaw action of the dual outputs in said first and second firing waves permit only one of said switch devices to conduct at any one time.

9. A control circuit as recited in claim 8 wherein said trigger means comprises first and second pulse generators, each of said pulse generators being coupled to said thyristor, the first pulse generator being controlled by said first switch device and the second pulse generator being controlled by said second switch device, each pulse generator including a voltage breakdown device.

10. A control circuit as recited in claim 9 wherein said voltage breakdown device is a DIAC.

11. A control circuit for a TRIAC AC to DC reversible motor drive, comprising:
    first and second trigger pulse generators coupled to said TRIAC to control the conduction thereof,
    voltage supply means coupled to said AC source to derive a controlled width direct voltage pulse each half cycle of said AC,
    said voltage supply means being coupled to said first and second trigger pulse generators to provide said direct voltage pulses as a supply voltage therefor,
    switch means including first and second transistors coupling said voltage supply means to said trigger pulse generators, and voltage command means including a differential amplifier to provide dual direct voltage command of opposite sense with respect to a reference at-rest amplifier output level, means to adjust the level of said dual direct voltage command, phase shift means each coupled to said source of AC and to said differential amplifier to combine each amplifier output with a phase shifted AC wave to form first and second AC plus DC firing waves, said firing waves being coupled to control the conductivity of said first and second transistors, whereby the switching of said transistors determines the time of initiation of pulse generation by said trigger pulse generators within selected half cycles of said AC and the duration of said direct voltage pulses from said voltage supply means determining the cessation of trigger pulses by said pulse generators to permit turnoff of said TRIAC with each half cycle zero crossover.

References Cited

UNITED STATES PATENTS 3,183,425  5/1965  Slawson.
3,188,542  6/1965  Dietrich.

OTHER REFERENCES

"Economy Power Semiconductor Applications," F. W. Gutzwiller and E. K. Howell, General Electric Seminar Application Information, March 1965, p. 14.

WILLIAM M. SHOOP, JR., Primary Examiner

U.S. Cl. X.R.
307—305; 318—227

UNITED STATES PATENT OFFICE
CERTIFICATE OF CORRECTION

Patent No. 3,543,137　　　　　　　　　Dated November 24, 1970

Inventor(s) Ernest F. Kubler

It is certified that error appears in the above-identified patent and that said Letters Patent are hereby corrected as shown below:

All the matter contained in columns 1 through 10 should be canceled and the following should be inserted.

Signed and sealed this 16th day of November 1971.

(SEAL)
Attest:

EDWARD M. FLETCHER, JR.　　　　　ROBERT GOTTSCHALK
Attesting Officer　　　　　　　　　　Acting Commissioner of Patents